(12) United States Patent
Chang et al.

(10) Patent No.: US 12,520,737 B2
(45) Date of Patent: Jan. 6, 2026

(54) RRAM STRUCTURE AND METHOD OF FABRICATING THE SAME

(71) Applicant: UNITED MICROELECTRONICS CORP., Hsin-Chu (TW)

(72) Inventors: Kai-Jiun Chang, Taoyuan (TW); Chun-Hung Cheng, Kaohsiung (TW); Chuan-Fu Wang, Miaoli County (TW)

(73) Assignee: UNITED MICROELECTRONICS CORP., Hsin-Chu (TW)

( * ) Notice: Subject to any disclaimer, the term of this patent is extended or adjusted under 35 U.S.C. 154(b) by 608 days.

(21) Appl. No.: 17/938,926

(22) Filed: Sep. 6, 2022

(65) Prior Publication Data

US 2024/0057487 A1    Feb. 15, 2024

(30) Foreign Application Priority Data

Aug. 9, 2022   (TW) .................................. 111129906

(51) Int. Cl.
*H10N 70/00* (2023.01)
*G11C 13/00* (2006.01)
*H10B 63/00* (2023.01)

(52) U.S. Cl.
CPC ....... *H10N 70/826* (2023.02); *G11C 13/0007* (2013.01); *H10B 63/82* (2023.02); *H10N 70/063* (2023.02); *H10N 70/8833* (2023.02)

(58) Field of Classification Search
CPC ............. H10N 70/826; H10N 70/8418; H10N 70/8265
See application file for complete search history.

(56) References Cited

U.S. PATENT DOCUMENTS

| | | | |
|---|---|---|---|
| 2020/0295085 A1 | 9/2020 | Chen | |
| 2020/0411758 A1 | 12/2020 | Lin | |
| 2022/0140239 A1* | 5/2022 | Su | H10N 70/826 257/4 |
| 2022/0190240 A1 | 6/2022 | Tseng | |
| 2022/0216403 A1 | 7/2022 | Chang | |

FOREIGN PATENT DOCUMENTS

| | | |
|---|---|---|
| TW | 201803031 A | 1/2018 |
| TW | 201906206 A | 2/2019 |
| TW | 202021052 A | 6/2020 |
| TW | 202115775 A | 4/2021 |
| TW | 202123323 A | 6/2021 |
| TW | 202147651 A | 12/2021 |

OTHER PUBLICATIONS

Wang, the specification, including the claims, and drawings in the U.S. Appl. No. 17/404,934, filed Aug. 17, 2021.

* cited by examiner

*Primary Examiner* — Mark V Prenty
(74) *Attorney, Agent, or Firm* — Winston Hsu

(57) ABSTRACT

An RRAM includes a bottom electrode, a resistive switching layer and a top electrode. The bottom electrode includes an inverted T-shaped profile. The resistive switching layer covers the bottom electrode. The top electrode covers the resistive switching layer. The inverted T-shaped profile includes a bottom element and a vertical element. The vertical element is disposed on the bottom element. The shape of the vertical element includes a rectangle or a trapezoid.

21 Claims, 6 Drawing Sheets

RRAM STRUCTURE AND METHOD OF FABRICATING THE SAME

BACKGROUND OF THE INVENTION

1. Field of the Invention

The present invention relates to a resistive random access memory (RRAM), and more particularly to an RRAM which has an inverted T-shaped bottom electrode and a method of fabricating the same.

2. Description of the Prior Art

Nonvolatile memory is capable of retaining the stored information even when unpowered. Non-volatile memory may be used for secondary storage or long-term persistent storage. RRAM technology has been gradually recognized as having exhibited those semiconductor memory advantages.

RRAM cells are non-volatile memory cells that store information by changes in electric resistance, not by changes in charge capacity. In general, the resistance of the resistive layer varies according to an applied voltage. An RRAM cell can be in a plurality of states in which the electric resistances are different. Each different state may represent a digital information. The state can be changed by applying a predetermined voltage or current between the electrodes. A state is maintained as long as a predetermined operation is not performed.

With the growth of electronic data, the demand for memory with high capacity, high read/write cycles and fast read/write speed has also increased significantly. In order to achieve higher efficiency, the programming speed of RRAM must be accelerated.

SUMMARY OF THE INVENTION

In view of this, the present invention provides an RRAM structure to increase programming speed by enhancing electric field.

According to a preferred embodiment of the present invention, an RRAM, includes a bottom electrode including an inverted T-shaped profile, a resistive switching layer covering the bottom electrode and a top electrode covering the resistive switching layer.

According to another preferred embodiment of the present invention, a fabricating method of an RRAM includes forming a bottom electrode, wherein the bottom electrode includes an inverted T-shaped profile. Next, a resistive switching layer and a top electrode layer are formed from bottom to top, wherein the resistive switching layer and the top electrode layer cover the bottom electrode.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 to FIG. 8 depicts a fabricating method of an RRAM according to a preferred embodiment of the present invention, wherein:

FIG. 1 depicts dielectric layers covered by a dummy material layer and a metal layer;

FIG. 2 is a fabricating stage in continuous of FIG. 1;

FIG. 3 is a fabricating stage in continuous of FIG. 2;

FIG. 4 is a fabricating stage in continuous of FIG. 3;

FIG. 5 is a fabricating stage in continuous of FIG. 4;

FIG. 6 is a fabricating stage in continuous of FIG. 5;

FIG. 7 is a fabricating stage in continuous of FIG. 6; and

FIG. 8 is a fabricating stage in continuous of FIG. 7.

DETAILED DESCRIPTION

FIG. 1 to FIG. 8 depicts a fabricating method of an RRAM according to a preferred embodiment of the present invention.

Figure 1:
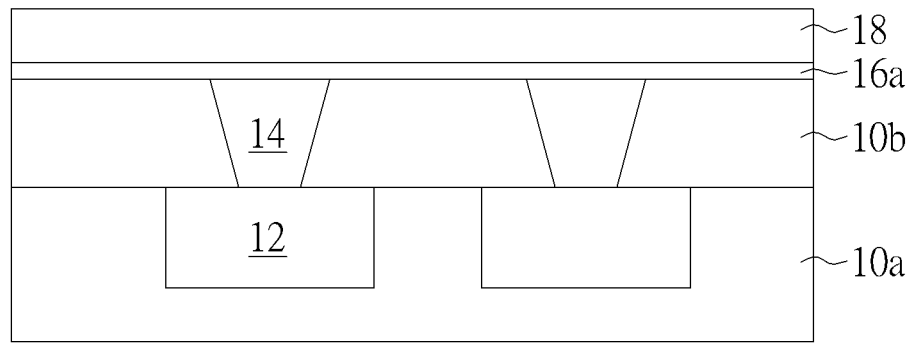

As shown in FIG. 1, a first dielectric layer 10a and a second dielectric layer 10b are provided. The second dielectric layer 10b covers the first dielectric layer 10a. A metal line 12 is disposed within the first dielectric layer 10a. A conductive plug 14 is disposed within the second dielectric layer 10b. The conductive plug 14 contacts the metal line 12. Next, a first metal layer 16a is formed to cover the second dielectric layer 10b and contacts the conductive plug 14. Later, a dummy material layer 18 is formed to cover the first metal layer 16a. The first dielectric layer 10a and the second dielectric layer 10b may include silicon oxide, silicon nitride or other insulating materials. The metal line 12 and the conductive plug 14 may include copper, nickel, tungsten or other conductive materials. The dummy material layer 18 may include silicon oxide.

Figure 2:
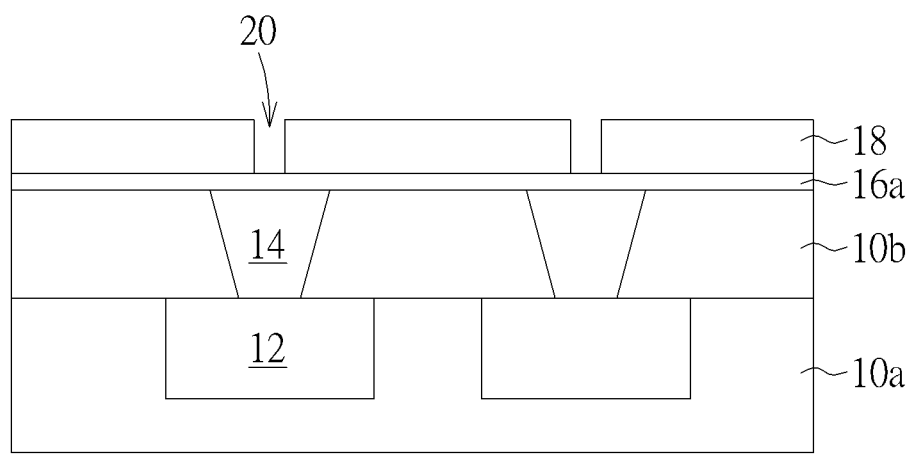
Figure 9:
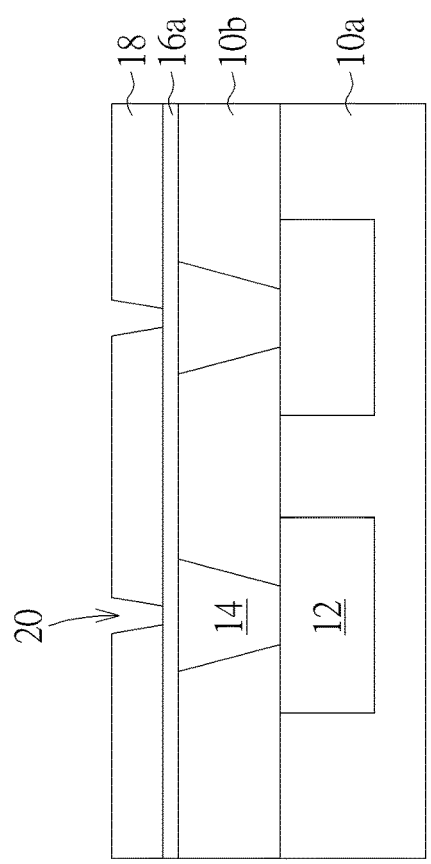
FIG. 9 depicts a shape of a recess according to different embodiments.

As shown in FIG. 2, the dummy material layer 18 is etched to form a recess 20 to make the first metal layer 16a to be exposed through the recess 20. The shape of the recess 20 can be altered based on different etching conditions. For example, the recess 20 shown in FIG. 2 is rectangular. That is, the width of the opening of the recess 20 is of the same size as the width of the bottom of the recess 20. On the other hand, as shown in FIG. 9, the recess 20 can be in a shape of a trapezoid. The trapezoid can have an upper base greater than a lower base as shown at the left figure of FIG. 9. Alternatively, the trapezoid can have a lower base greater than an upper base as shown at the right figure of FIG. 9.

Figure 3:
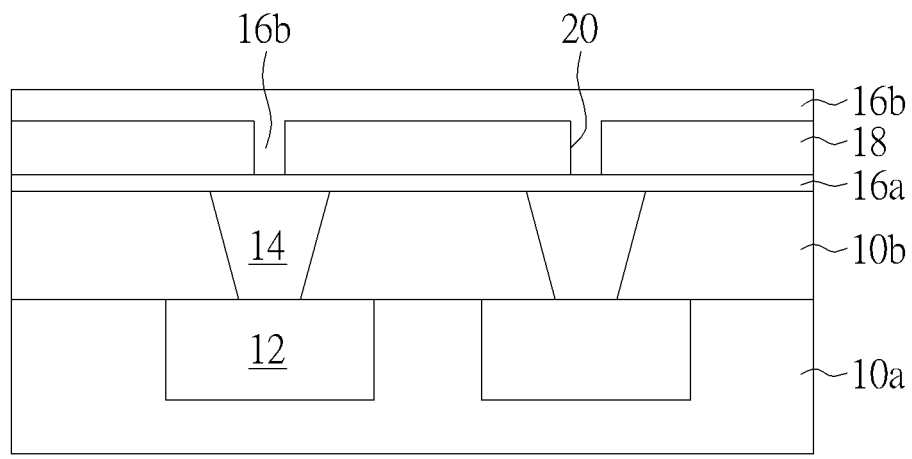
Figure 4:
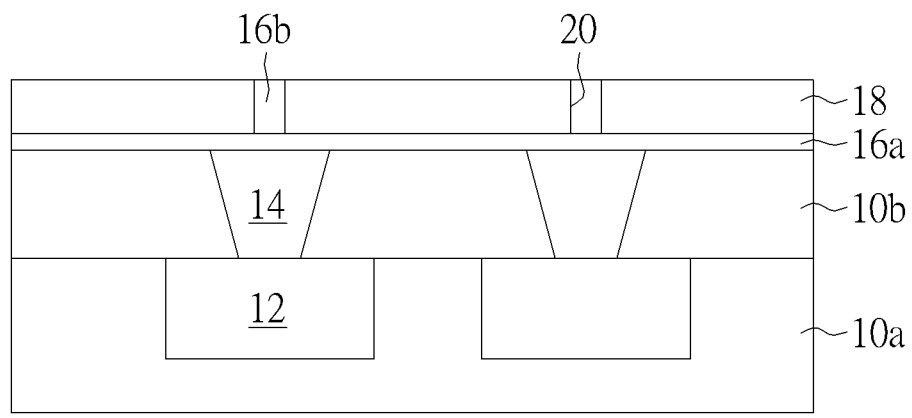
Figure 5:
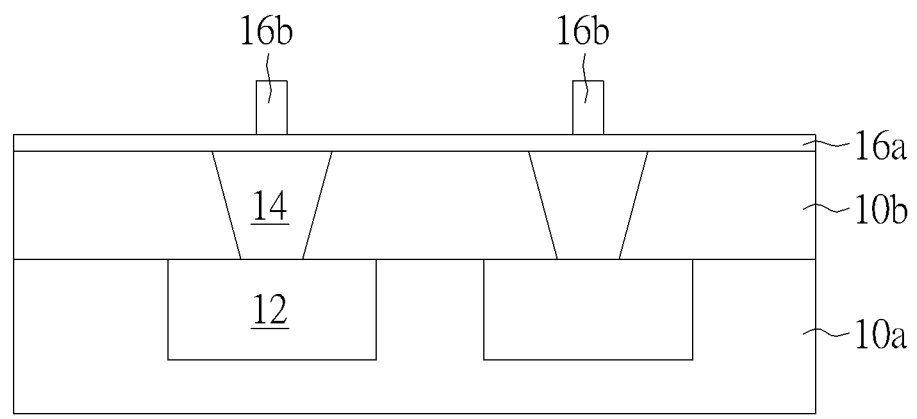
Figure 6:
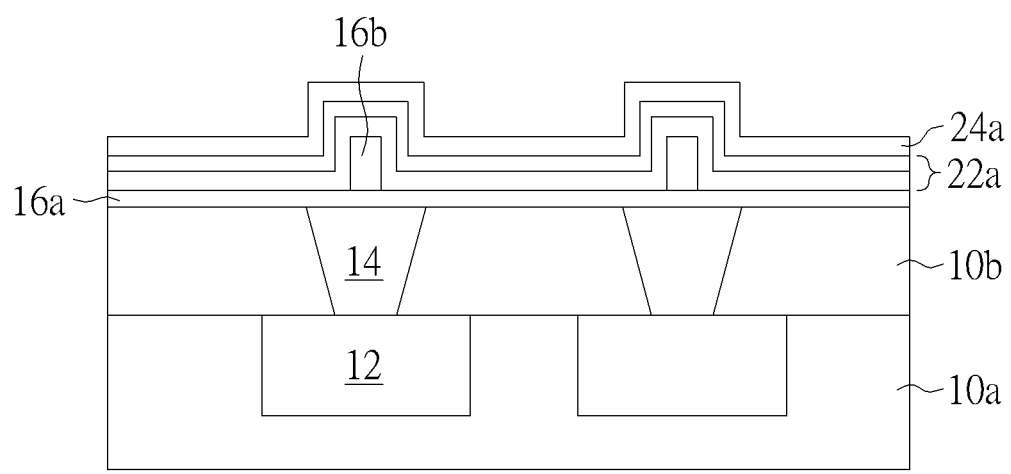

As shown in FIG. 3, a second metal layer 16b is formed to cover the second dielectric layer 10b and fill up the recess 20. The second metal layer 16b contacts the first metal layer 16a. As shown in FIG. 4, the second metal layer 16b is planarized to remove the second metal layer 16b outside of the recess 20. As shown in FIG. 5, the dummy material layer 18 is removed. As shown in FIG. 6, a resistive switching material layer 22a (shown as two layers in the figure) and a third metal layer 24a are formed to conformally cover the second metal layer 16b and the first metal layer 16a.

Figure 7:
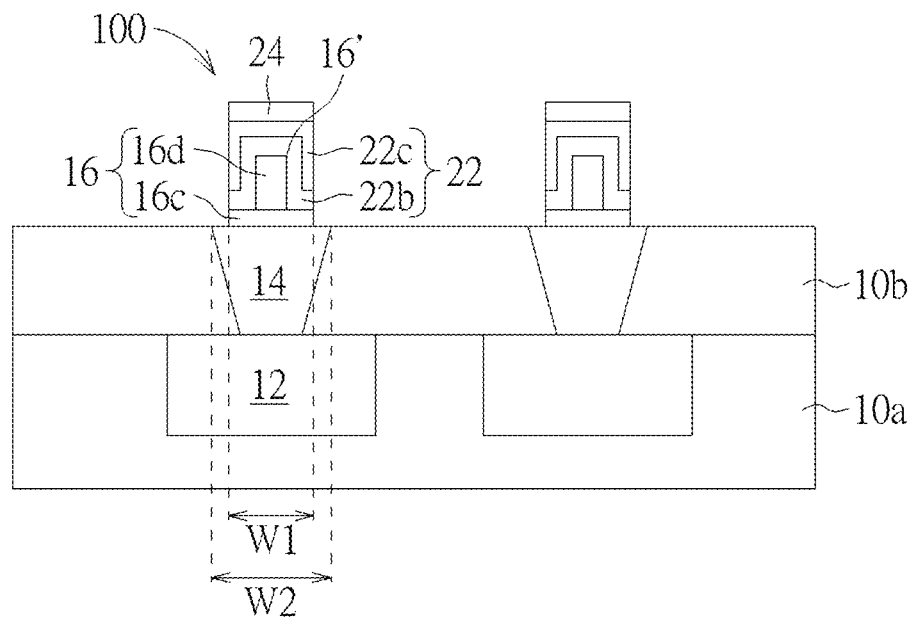

As shown in FIG. 7, the third metal layer 24a, the resistive switching layer 22a and the first metal layer 16a are patterned. After the patterning, the third metal layer 24a becomes a top electrode 24, the resistive switching material layer 22a becomes a resistive switching layer 22, the first metal layer 16a and the second metal layer 16b together become a bottom electrode 16. The top electrode 24, the resistive switching layer 22 and the bottom electrode 16 together form an RRAM 100. The patterning process can be an etching process. It is noteworthy that the bottom electrode 16 includes an inverted T-shaped profile. Moreover, when patterning the third metal layer 24a, the resistive switching material layer 22a and the first metal layer 16a, the second metal layer 16b is not patterned.

Figure 8:
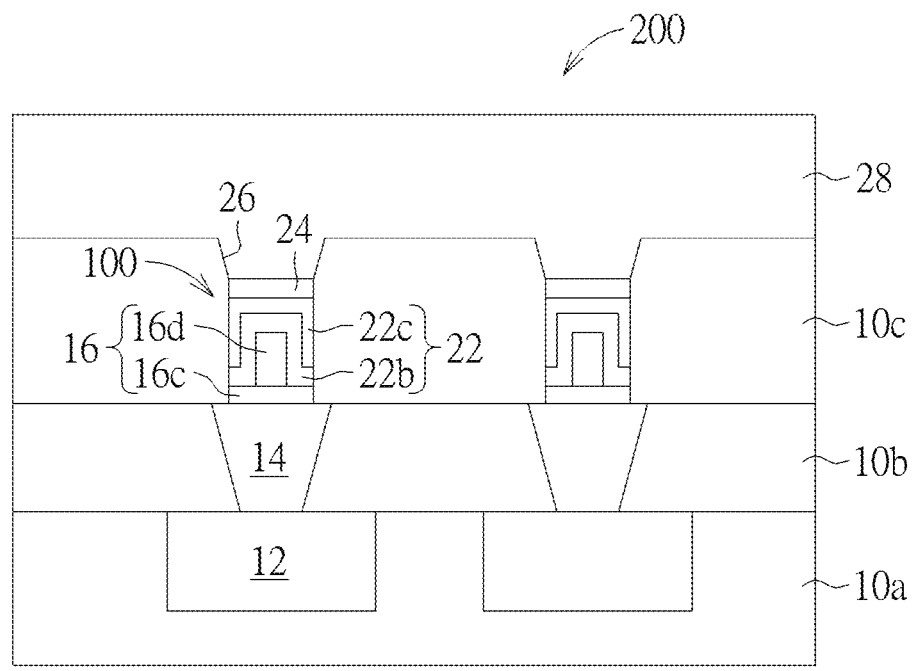

As shown in FIG. 8, a third dielectric layer 10c is formed to cover the second dielectric layer 10b and the RRAM 100. Next, a trench 26 is formed in the third dielectric layer 10c to expose the top electrode 24. Thereafter, a fourth metal layer 28 is formed to cover the third dielectric layer 10c and fill in the trench 26. The part of the fourth metal layer 28 which fills in the trench 26 serves as a contact plug. The fourth metal layer 28 contacts the top electrode 24. Now, an RRAM structure 200 of the present invention is completed.

The third dielectric layer 10c comprises silicon oxide, silicon nitride, low-k materials or other insulating materials. The first metal layer 16a and the second metal layer 16b include tantalum, titanium, titanium nitride, tantalum nitride or other metals. The third metal layer 24 includes iridium or other metals. The resistive switching material layer 22a includes tantalum oxide, nickel oxide, hafnium oxide or other transition metal oxides.

FIG. 7 depicts an RRAM according to a preferred embodiment of the present invention.

Figure 10:
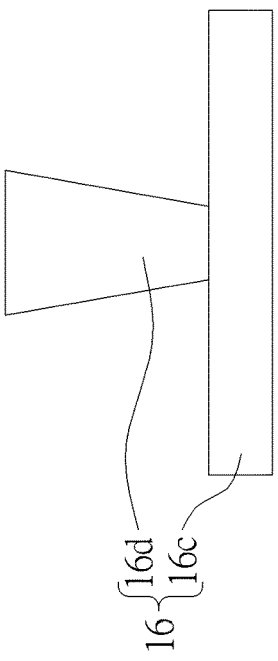
FIG. 10 depicts a shape of a bottom electrode according to different embodiments.

As shown in FIG. 7, a second dielectric layer 10b is provided. A conductive plug 14 is disposed within the second dielectric layer 10b. The conductive plug 14 has a second largest width W2. An RRAM 100 is disposed on the second dielectric layer 10b. The RRAM 100 includes a bottom electrode 16. The bottom electrode 16 includes an inverted T-shaped profile. A resistive switching layer 22 covers the bottom electrode 16. A top electrode 24 covers the resistive switching layer 22. The resistive switching layer 22 includes an oxygen atom storage layer 22b and a filament formation layer 22c, and the filament formation layer 22c is disposed on the oxygen atom storage layer 22b. The inverted T-shaped profile includes a bottom element 16c and a vertical element 16d. The vertical element 16d is disposed on and connects to the bottom element 16c. The bottom element 16c of the bottom electrode 16 contacts the conductive plug 14. The bottom element 16c has a first largest width W1. The first largest width W1 is smaller than the second largest width W2. The shape of the vertical element 16d is a rectangle as shown in FIG. 7. In another embodiment, the shape of the vertical element 16d can be a trapezoid. For example, as shown in the left figure of FIG. 10, the vertical element 16d is a trapezoid with an upper base greater than a lower base and the lower base contacting the bottom element 16c. As shown in the right figure of FIG. 10, the vertical element 16d is a trapezoid with a lower base greater than an upper base and the lower base contacting the bottom element 16c.

Please refer to FIG. 7 again. The resistive switching layer 22 surrounds the vertical element 16d. In details, the oxygen atom storage layer 22b contacts and surrounds the vertical element 16d. Furthermore, when patterning the third metal layer 24a, the resistive switching material layer 22a, and the first metal layer 16a during the steps mentioned above, the widths of the third metal layer 24a, the resistive switching material layer 22a, and the first metal layer 16a can be adjusted. According to different widths, the top electrode 24 can be in a shape of a rectangle, an inverted U or a square wave. The filament formation layer 22c of the resistive switching layer 22 can be in shape of an inverted U or a square wave. In details, the shape of the square wave includes an inverted U with two rectangles respectively extending laterally from two ends of the U. As shown in FIG. 7, the top electrode 24 is in a shape of a rectangle, and the filament formation layer 22c is in a shape of an inverted U. Alternatively, as shown in the left figure of FIG. 11, the top electrode 24 is in a shape of an inverted U and the filament formation layer 22c is in a shape of a square wave. As shown in the right figure of FIG. 11, the top electrode 24 is in a shape of a first square wave and the filament formation layer 22c is in a shape of a second square wave. The first largest width W1 of the bottom element 16c is greater than the second largest width W2 of the conductive plug 14. The resistive switching layer 22 includes tantalum oxide, nickel oxide, hafnium oxide or other transition metal oxides. More specifically speaking, the oxygen atom storage layer 22b includes $TaO_x$ (x<2.5), and the filament formation layer 22c include $Ta_2O_5$. The top electrode 24 and the bottom electrode 16 include tantalum, titanium, iridium, titanium nitride, tantalum nitride or other conductive materials. In this embodiment, the top electrode 24 is preferably iridium. The bottom electrode 16 is preferably tantalum or titanium. Because the bottom element 16c and the vertical element 16d are not monolithic, the bottom element 16c and the vertical element 16d can be made of the same or different materials. In this embodiment, the bottom element 16c and the vertical element 16d are made of the same material.

Figure 11:
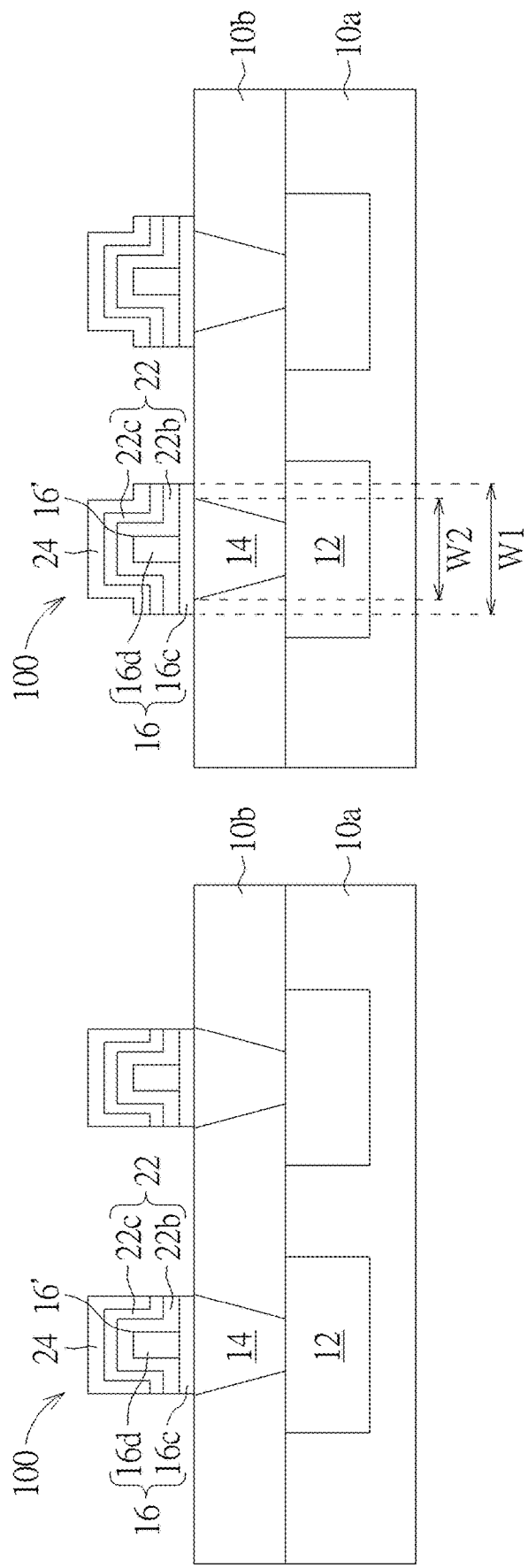
FIG. 11 depicts different shapes of a filament formation layer and a top electrode.

After applying voltage bias to the top electrode 24 and the bottom electrode 16, electric field generates around the resistive switching layer 22. Then, part of oxygen atoms in the filament formation layer 22c leave their lattice, move to the oxygen atom storage layer 22b and are stored within the oxygen atom storage layer 22b. In this way, oxygen vacancies are formed within the filament formation layer 22c, and the oxygen vacancies generates conductive filaments to make the RRAM 100 in a low resistance state. The higher the electric field, the faster the filaments can be generated. That is, when the electric field becomes higher, the RRAM 100 can be switched faster between the low resistance state and high resistance state. Therefore, the bottom electrode 16 is designed as an inverted T-shaped profile in the present invention. As shown in FIG. 7 and FIG. 11, the resistive switching layer 22 surrounds a tip 16' of the vertical element 16d. Electric field is enhanced at the tip 16' of the vertical element 16d, filaments in the resistive switching layer 22 surrounding the tip 16' of the vertical element 16d will generate faster. In this way, programming speed of RRAM 100 can be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A resistive random access memory (RRAM), comprising:
    a bottom electrode comprising an inverted T-shaped profile;
    a resistive switching layer covering the bottom electrode; and
    a top electrode covering the resistive switching layer;
    wherein the inverted T-shaped profile comprises a bottom element and a vertical element disposed on the bottom element, and a shape of the vertical element comprises a rectangle or a trapezoid.

2. The RRAM of claim 1, wherein an upper base of the trapezoid is greater than a lower base of the trapezoid, and the lower base of the trapezoid contacts the bottom element.

3. The RRAM of claim 1, wherein a lower base of the trapezoid is greater than an upper base of the trapezoid, and the lower base of the trapezoid contacts the bottom element.

4. The RRAM of claim 1, wherein the resistive switching layer surrounds the vertical element.

5. The RRAM of claim 1, wherein a shape of the top electrode comprises a rectangle, an inverted U shape or a square wave.

6. The RRAM of claim 1, wherein the resistive switching layer comprises an oxygen atom storage layer and a filament formation layer, and the filament formation layer is disposed on the oxygen atom storage layer.

7. The RRAM of claim 6, wherein the top electrode is rectangular, and the filament formation layer is inverted U-shaped.

8. The RRAM of claim 6, wherein the top electrode is inverted U-shaped and the filament formation layer is in a shape of a square wave.

9. The RRAM of claim 6, wherein the top electrode is in a shape of a first square wave and the filament formation layer is in a shape of a second square wave.

10. The RRAM of claim 6, wherein the oxygen atom storage layer comprises $TaO_x$ (x<2.5), and the filament formation layer comprises $Ta_2O_5$.

11. The RRAM of claim 1, wherein the vertical element comprises a tip, and the resistive switching layer surrounds the tip of the vertical element.

12. The RRAM of claim 1, wherein the bottom element and the vertical element are made of the same or different materials.

13. The RRAM of claim 1, further comprising a dielectric layer and a conductive plug disposed within the dielectric layer, and the bottom electrode contacts the conductive plug.

14. The RRAM of claim 13, wherein the bottom element of the bottom electrode comprises a first largest width and the conductive plug comprises a second largest width, and the first largest width is smaller or larger than the second largest width.

15. The RRAM of claim 14, wherein the first largest width is smaller than the second largest width, and the top electrode is in a shape of a rectangle.

16. The RRAM of claim 15, wherein the resistive switching layer comprises an oxygen atom storage layer and a filament formation layer on the oxygen atom storage layer, and the filament formation layer is in a shape of an inverted U.

17. The RRAM of claim 14, wherein the first largest width is larger than the second largest width, and the top electrode is in a shape of a first square wave.

18. The RRAM of claim 17, wherein the resistive switching layer comprises an oxygen atom storage layer and a filament formation layer on the oxygen atom storage layer, and the filament formation layer is in a shape of a second square wave.

19. A resistive random access memory (RRAM) structure, comprising:
   an RRAM, wherein the RRAM comprises:
      a bottom electrode comprising an inverted T-shaped profile, and wherein the inverted T-shaped profile comprises a bottom element and a vertical element disposed on the bottom element, and a shape of the vertical element comprises a rectangle or a trapezoid;
      a resistive switching layer covering the bottom electrode; and
      a top electrode covering the resistive switching layer;
   a dielectric layer covering the RRAM; and
   a trench in the dielectric layer and exposing the top electrode.

20. The RRAM structure of claim 19, further comprising a metal layer covering the dielectric layer and filling in the trench.

21. The RRAM structure of claim 20, wherein the top electrode comprises a first top surface and the dielectric layer comprises a second top surface higher than the first top surface.

* * * * *